Aug. 9, 1960 M. A. GOFF 2,948,053
METHOD OF MANUFACTURING REFRIGERATING APPARATUS
Filed March 23, 1956 2 Sheets-Sheet 1

INVENTOR.
MAURICE A. GOFF
BY
Carl H. Synnestvedt
AGENT

Aug. 9, 1960   M. A. GOFF   2,948,053
METHOD OF MANUFACTURING REFRIGERATING APPARATUS
Filed March 23, 1956   2 Sheets-Sheet 2

INVENTOR.
MAURICE A. GOFF
BY
Carl H. Synnestvedt
AGENT

United States Patent Office 2,948,053
Patented Aug. 9, 1960

2,948,053

METHOD OF MANUFACTURING REFRIGERATING APPARATUS

Maurice A. Goff, Ambler, Pa., assignor to Philco Corporation, Philadelphia, Pa., a corporation of Pennsylvania Filed Mar. 23, 1956, Ser. No. 573,536

1 Claim. (Cl. 29—157.3)

My invention has to do with restrictors in refrigerating apparatus of roll-forged and similar types; and particularly it relates to methods of manufacturing so-called capillary tube restrictors.

For many years, refrigerators have been built with heat exchangers interconnected by systems of separate tubes and fittings; and it has become usual, in particular, to provide a tubular restrictor or so-called capillary passage between condenser and evaporator means forming part of such a system. On the other hand it has become possible to combine tube and sheet structures in the construction of integral heat exchangers forming part of the system; and particularly evaporators have thus been formed as unitary tube and sheet structures. In order to reduce both expense and possibilities of trouble caused by fittings and connectors, comprehensive use can now be made of unitary, desirably laminated and roll-forged, conduit-forming metal sheeting, incorporating all or most of the heat exchangers and auxiliary passageways of a complete refrigerator, by lancing and bending a single plate of such sheeting as disclosed in the co-pending application of Harold W. Schaefer et al., bearing Serial No. 569,635, filed on March 5, 1956, and assigned to the assignee of the present invention.

In practice, certain difficulties have been encountered, pertaining to the restrictors forming parts of such systems. The sheet metal processes suitable for forming refrigerant passageways in general, particularly the efficient processes of roll-forging and subsequent inflating, are unable to form ducts of such widely different flow area as a capillary conduit and any of the ordinary passageways for a refrigerant circuit. On the other hand, the known methods of extruding and otherwise manipulating separate lengths of capillary tubing are inapplicable to fabrication of a wide sheet structure with a system of integral passages therein.

Pursuant to further analysis of these problems and after experimentation with different materials and operating steps, I discovered a possibility of overcoming this set of difficulties and of producing a unitary sheet structure which integrally incorporates both ordinary and capillary passageways for a refrigerant circuit. The new structure was found able to retain the form of the integral capillary passageway, incorporated therein, with high mechanical strength, against forces tending to destroy this form.

Thus it is a general object of the invention to provide a unitary, metallic sheet structure incorporating both capillary and ordinary passageways for refrigerating apparatus. Another object is to provide a simple method of forming the structure, involving only a single roll-forging and inflating operation and only brief, reliable and inexpensive steps in addition thereto. Still other objects are: to facilitate heat exchange between the capillary passageway and an associated larger passageway; to minimize heat exchange between these combined passageways and other parts of the unitary sheet structure; to provide a structure of high mechanical strength and flexibility; to form smooth, regular, inner wall surfaces, both along the capillary and ordinary passageways and at the transitions of one to the other; and to minimize or eliminate difficulties caused by any use of dissimilar metals.

Briefly described, a preferred embodiment of the new structure comprises a pair of surface-bonded, desirably roll-forged laminations of similar metal, in face to face relationship, with a system of elongated passageways integrally formed by and between the same. The system of passageways comprises a plurality of ordinary, relatively wide passages to form heat exchangers and auxiliary connections, and also comprises a much narrower, elongated, smooth and uniform capillary passage, interconnecting two of the heat exchangers. The sheet metal is relatively compacted and hard in a section extending over and along the capillary passageway, which section forms an elongated part of a narrow strip partly severed from the composite structure; said strip also having another parallel elongated part, containing a larger suction passage, adjacent to the capillary conduit.

The hardening of the strip portion containing the restrictor may be produced by compressing the sheet metal around a wire inserted in a passage of intermediate size; the wire being withdrawn to form the restrictor passage.

The features, advantages and objects of the new structures and of methods of making these structures will become more apparent from consideration of an exemplary structure, which will now be described.

Figure 3:
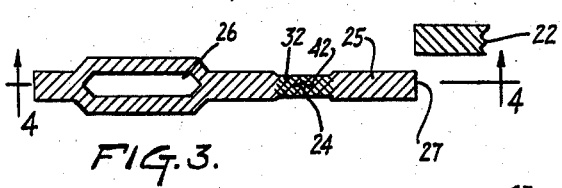
Figure 3 is an additionally enlarged, sectional detail view, taken along line 3—3 in Figue 2.
Figure 10:
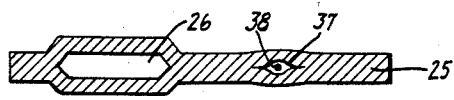
Figure 11:
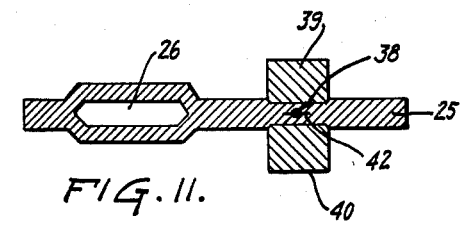
Figure 12:
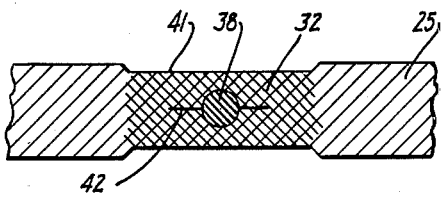

Figures 5 to 11, inclusive, are sectional views generally similar to Figure 3 but showing the structure in consecutive phases of the preferred fabricating process; and Figure 12 is a still more enlarged detail from Figure 11.

Figure 1:
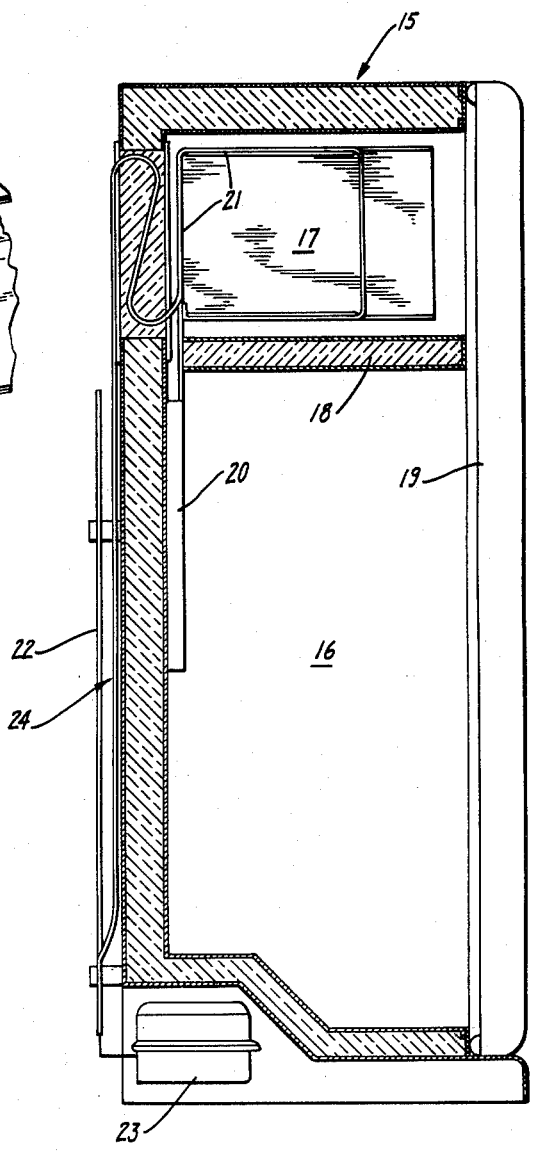
Figure 1 is a sectional view of a complete, domestic, two-compartment refrigerator comprising, integrally therewith, a capillary conduit structure in accordance with the present invention.

Referring to Figure 1, the reference numeral 15 designates the refrigerator cabinet in general, while the numerals 16 and 17 designate respectively food storage and freezer compartments therein, these compartments being separated by a heat insulating partition 18. The cabinet is of a well-known open-front type with a door 19. The compartments 16 and 17 are refrigerated by evaporators 20 and 21 respectively, both of which are connected in refrigerant flow circuit, particularly by a series circuit, with a condenser 22, positioned across the outside of the back wall of the refrigerator. For this purpose there is interposed between the condenser and the system of evaporators, on the one hand, a compressor 23 and on the other hand, a straight, elongated capillary restrictor conduit 24 which interconnects the outlet of the condenser 22 with the inlet of the system of evaporators 20 and 21.

Figure 2:
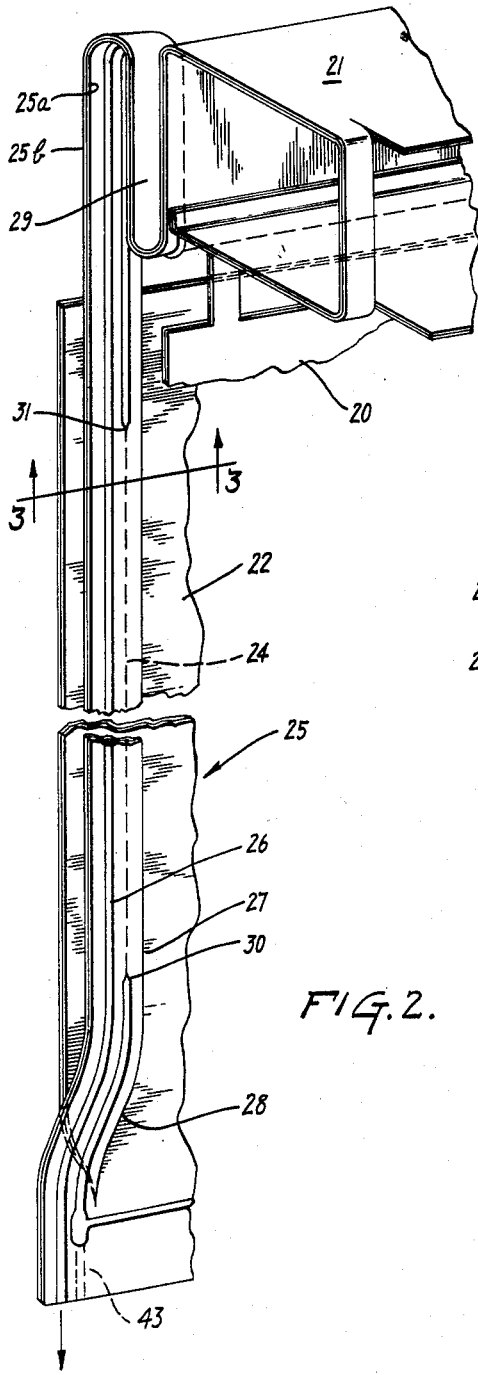
Figure 2 is an enlarged, schematic, perspective view of the capillary conduit structure, together with adjacent parts of the heat exchanger system forming part of the refrigerator of Figure 1.

As shown in Figure 2, all of the capillary conduit 24, the refrigerant passageways forming the heat exchangers 20, 21 and 22 and their ordinary, interconnecting ducts are integrally incorporated in a single, smooth, originally flat and coherent sheeting structure 25, desirably formed of a pair of laminations 25a, 25b of aluminum or similar heat conducting metal, and preferably made in accordance with the invention disclosed in said copending application of Schaefer et al. One of the integral ducts of ordinary size is the suction duct 26, which interconnects the evaporator outlet with the compressor 23 (Fig. 1) and which preferably (Fig. 2) extends parallel and adjacent to the capillary 24, along the entire length of the latter and of a generally flat metal strip 27 forming part of the unitary sheeting 25.

The portion of this strip 27, shown in Figure 3, is severed and displaced from the adjacent panel 22, forming part of the unitary sheeting, and is disposed in a plane of its own. However, it is interconnected with this panel 22 and with other parts of the integral sheet structure by bent sheeting portions 28, 29 (Fig. 2), which also serve as passageway structures, keeping the refrigerant circuit complete and uninterrupted. Between or adjacent these bent sheet portions 28, 29, transition areas 30, 31 are formed in the passageway system, connecting the capillary conduit 24 with the condenser 22 at the one end and with the evaporators 20, 21 at the other end.

The cross-sectional areas of some of the passageways 20, 21, 22, 26 may be larger than those of others; but the cross-sectional area of the capillary conduit 24 (Fig. 3) must be of an order of magnitude which is minute in comparison with all other passages of the system referred to, in order that this conduit may impose an effective restriction upon the flow of condensed refrigerant to the evaporator. Detail variations are possible as to this minute capillary area, as is well known to the art; and no specific dimensional data are believed to be required herein. However, it may be mentioned that in normal practice, each ordinary duct area is at least about twenty times larger and often about a hundred times larger than the capillary conduit area. In order to control the restrictive effect of the capillary passage with accuracy, longitudinal dimensions of the passage may be varied in the fabricating process, as will be described hereinafter.

Figure 4:
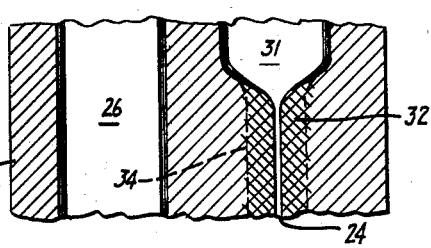
Figure 4 is a sectional detail view, taken along line 4—4 in Figure 3.

Attention may here be drawn to the fact that, as shown in Figures 3, 4 and 12, the boundary walls of the capillary conduit are advantageously formed by a portion 32 of the sheeting structure 25 which is molded around a smooth core wire, in the fabricating process. Accordingly, these walls are formed as an impression of said smooth wire and as compacted and work-hardened metal structures, tending to retain their impressed forms with great strength, against the tendency of the refrigerant fluid pressure, in normal operation, to expand the capillary passageway and against other disruptive, erosive, corrosive and other disturbing influences which may attack these walls during the normal operation of the refrigerator or incident to service operations and the like. In this connection it is also important that the walls of the capillary 24 consist entirely of uniform metal, avoiding all problems of soldering, brazing or welding dissimilar metals.

It is believed to be unnecessary to describe the refrigerator operating cycle of the complete flow system in detail. The pair of passageways 24, 26, shown in Figures 2, 3 and 4 simply provide areas for fluid flows. A heat exchange takes place through the intermediate sheet metal portions 32, 25, since the refrigerant liquid in the small passageway 24 is hot whereas the refrigerant vapor and/or liquid in the larger passageway 26 is relatively cool. The refrigerant in the capillary passageway, as mentioned, has a tendency to expand this passageway; this is due to the fluid pressure created by the compressor and applied to the condenser and the upstream portions of the capillary passageway. This pressure, as mentioned, is resisted by the walls of the capillary passageway.

Figure 5:
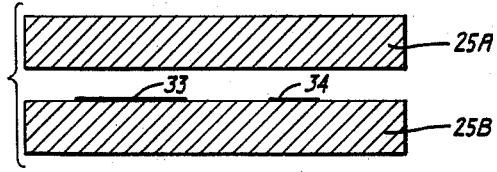

Referring now to Figure 5, my preferred method of fabricating the capillary conduit structure starts by placing a pair of relatively heavy metal plates 25A and 25B in face to face relationship, with thin and narrow strips 33 of stop-weld material applied to the inner face of one of these plates and forming a pattern corresponding to the desired heat exchanger and connector arrangement. In a suitable area of this pattern, a portion of the stop-weld material forms an equally thin and even narrowed strip 34 for the subsequent formation of the capillary passageway. This strip 34 may often be, for instance, only half as wide as the narrowest portion of the remainder of the strip 33; or, more generally expressed, it is made just as narrow as it can possibly be made by normal roll-forging or similar techniques. This, however, is still so enormously wide that no proper restrictor can be made therefrom by said normal techniques. The strip portion 34 prepared in this manner, is therefore only intended to provide a preliminary passage area, to be converted into a capillary passage by further operations. Said strip 34 has a length which may typically amount to about one-quarter of the intended ultimate length of the capillary passage 24.

Figure 6:
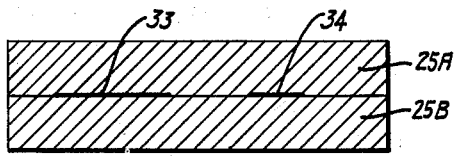
Figure 7:

The plates 25A, 25B are then brought into a mutually contacting, laminar relationship, as shown in Figure 6. Next, as shown in Figure 7, they are combined into a single, coherent sheet 25, by passing them between a pair of pressure rollers, not shown. Uniform and integral bonding of the contacting plate surfaces is thus obtained at all points of the plate surfaces, except where the stop-weld material has been applied. Of course, it is possible in some bonding processes that laminations 25a, 25b (Fig. 2) may still be more or less distinguishable from one another at the edges of the sheet after the bonding.

The rolling is best performed in a direction parallel to the narrow, capillary conduit forming strip 34. The original thickness of the plates is greatly reduced in the roll-forging process, as shown; and there occurs a corresponding stretching out of the plates in a direction longitudinally of the direction of rolling. For the operations which follow, it would generally be undesirable to have such elongation occur in a direction transverse of a capillary conduit forming strip 34.

Figure 8:
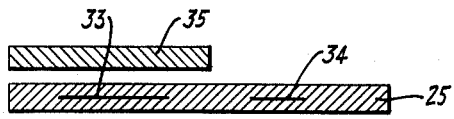
Figure 9:
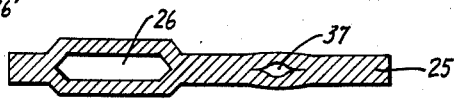

After the composite sheet 25 has been roll-forged in this manner, a pair of backing dies 35, 36 are provided, as diagrammatically shown in Figure 8, that is overlying all sheet portions containing the passage strips 33. While such backing dies are in place, a sufficiently high, internal fluid pressure is applied to the passage-forming strip areas to dilate the entire system of strips 33, 34 into a system of passages 37, 26, etc. diagrammatically shown in Figure 9. After an initial phase of this dilating operation, the sheet metal is backed up and the applied pressure largely absorbed by the backing dies, protecting the sheet metal from the danger of rupturing which would otherwise exist. Nevertheless, substantial transverse flow of metal occurs, causing permanent deformation of the sheet. This metal flow occurs mainly where passages of relatively large cross sectional area are formed, that is, where the pressurized sheet areas are relatively large in comparison with the metal cross sections absorbing the stresses resulting from the pressure applied.

A potentially permanent deformation of the metal is also obtained, by the dilating pressure, along the relatively narrow strip area 34; but relatively great resistance is here opposed to the metal deforming forces, by the unit strength of the roll-forged metal, since the ratio of pressurized sheet area to stress-absorbing metal section, in this strip area, is relatively low. For this reason, the width of the dilated area 34, transversely of the plane of the sheet, is relatively small; no restraining die is necessary when dilating this area 34 into a hollow portion 37; and, as mentioned above, the strip 34 generally can be made just as narrow as allowable by known roll-bonding techniques intended to form a passage area. For the same reasons that deformation which is applied to the metal in this area 34, 37 can subsequently be modified with relative ease, as will now be described.

A straight, smooth, hard, elongated wire 38 is inserted in the elongated, hollow portion 37, as shown in Figure 10. Thereupon, as shown in Figure 11, a set of press dies or equivalent means 39, 40 are applied to the part 41 of the composite sheeting 25 which lies adjacent to and extends along the hollow portion 37 and the wire 38 therein; but not necessarily along the entire length thereof.

The result of this last-mentioned operation is shown in Figure 12. The metal of the composite sheet 25, adjacent to and along the wire 38, is compressed in those cross-sectional areas thereof where it had previously been stretched to some extent. The former inside walls of the narrow passage 37 are collapsed into surface contact with one another, in elongated, flat areas 42 on both sides of the wire 38. No bonding of mutually facing metal portions can usually be obtained in these areas 42, since the application of pressure sufficient for such bonding would enlarge the strip area excessively; however the contact of the metal portions in areas 42 is intimate and sufficient, in the above-described operation of the device, to prevent propagation of fluid pressure into the areas 42 and objectionable spreading of metal walls in said areas. Said metal walls are molded to conform with one another in said areas and with the surface of the wire 38, in substantially complete and uniform surface contact. In an approximate manner, the cross-section of metal shown in Figure 8, adjacent strip 34, is reestablished by this operation; however, as a result of the successive tension and compression applied to the metal, work-hardening takes place in the capillary conduit forming area, as indicated by cross hatching between press-intended surface portions 41 in Figure 12. This work-hardening of the metal preserves the condition shown in Figures 12 and 3 even under the fluid pressure applied in the operation of the device.

If only a part of the length of the capillary conduit area is compressed by the dies 39, 40 (Figure 11), it is preferably a part comprising the lower end 43 of this area (Figure 2) which is left uncompressed, or only partly compressed, while parts thereof adjacent the upper transition portion 31 may be fully compressed. The reason will appear presently.

The last step of the preferred manufacturing process consists in withdrawing the wire 38 and thus converting the structure of Figure 12 into that of Figures 3 and 4. The circuit structure can then be exposed to various, conventional tests, relating in part to the characteristics of fluid flow therein, the details of which need not be described herein. Should it be found that the flow restriction provided by the capillary conduit 24, upon the partial compression of the area 34, does not entirely comply with predetermined requirements, a suitably greater restrictive effect can be obtained by added compression, after renewed, partial insertion of a wire 38 through the lowermost terminal part 43 and into adjacent parts of the elongated hollow portion 37. The terminal portion 43 may also serve to accommodate a dryer connection, as disclosed in the co-pending application of Malcolm G. Shoemaker and the present applicant, bearing Serial No. 573,537, filed March 23, 1956 now patented under 2,835,114, and assigned to the assignee of the present invention.

The operations indicated by Figures 5 to 9, and their costs, are the same as in normal roll-forging and pressure dilating of passages, irrespective of the capillary conduit structure. The only additional steps required particularly for the new capillary conduit structure are shown by Figures 10 and 11 and are of such simple and inexpensive nature as to be negligible from the standpoint of cost. These steps are much simpler and also much safer than the delicate operations heretofore required in capillary conduit forming and inserting procedures, applied to refrigerating apparatus, as indicated for instance in said application of Shoemaker et al.; and, as explained, the combined operations of the present method result in the formation of an integral capillary structure having most desirable characteristics.

While only a single embodiment of the new structure and a single manner of performing the new method have been described, it should be understood that the details thereof are not to be construed as limitative of the invention, except insofar as set forth in the following claim.

I claim:

A method of constructing a restrictor for a refrigerating evaporator unit consisting of metal sheeting roll-forged to provide passageways therein, said method comprising the steps of: making a duct in said unit, by the roll-forging of said sheeting, in such a way that such duct has transverse size similar to that of at least some of said roll-forged passageways, and has first and second end portions; connecting the first end portion of said duct with one end of said passageways; connecting said second end portion of said duct with outside atmosphere by an opening through the sheeting of said unit; thereafter inserting through said opening into said duct a hard, elongate core, of transverse size much smaller than the duct; then swaging a portion of said sheeting, along a longitudinally limited portion of said duct, around said core, so as to restrict said limited portion of the duct to the transverse size of said core and to harden the swaged portion of the sheeting, for making the restricted size permanent; and then removing the core through said opening, whereby said restrictor is formed as an integral part of said sheeting with cross-section much smaller than said passageways, and without distortion of such passageways.

References Cited in the file of this patent

UNITED STATES PATENTS

| | | |
|---|---|---|
| 987,093 | Wilson | Mar. 14, 1911 |
| 1,985,931 | Kucher | Jan. 1, 1935 |
| 2,231,162 | Hintze | Feb. 11, 1941 |
| 2,662,273 | Long | Dec. 15, 1953 |
| 2,690,002 | Grenell | Sept. 28, 1954 |
| 2,740,188 | Simmons | Apr. 3, 1956 |
| 2,747,258 | Kramer | May 29, 1956 |
| 2,779,168 | Jacobs et al. | Jan. 29, 1957 |